United States Patent [19]

Matsuoka et al.

[11] Patent Number: 4,985,785
[45] Date of Patent: Jan. 15, 1991

[54] ROTARY HEAD TYPE REPRODUCING APPARATUS

[75] Inventors: Hidetoshi Matsuoka, Hachioji; Masahito Natsume, Matsudo, both of Japan

[73] Assignee: Canon Kabushiki Kaisha, Tokyo, Japan

[21] Appl. No.: 436,101

[22] Filed: Nov. 13, 1989

Related U.S. Application Data

[63] Continuation of Ser. No. 320,791, Mar. 8, 1989, abandoned, which is a continuation of Ser. No. 925,303, Oct. 31, 1986, abandoned.

[30] Foreign Application Priority Data

Nov. 11, 1985 [JP] Japan .................. 60-250903

[51] Int. Cl.$^5$ .................................................. G11B 15/12
[52] U.S. Cl. ........................................ 360/62; 360/64
[58] Field of Search ................................. 360/62, 64

[56] References Cited

U.S. PATENT DOCUMENTS

| | | | |
|---|---|---|---|
| 4,210,945 | 7/1980 | Lavrentiev et al. | 360/108 |
| 4,319,294 | 3/1982 | Repp | 360/130.24 |
| 4,366,513 | 12/1982 | Satoh et al. | 360/66 |
| 4,455,584 | 6/1984 | Heitmann | 360/108 |
| 4,520,405 | 5/1985 | Sasaki et al. | 360/66 |
| 4,598,325 | 7/1986 | Tarzaiski | 360/67 |

FOREIGN PATENT DOCUMENTS 0110680  6/1984  European Pat. Off. .............. 360/64

*Primary Examiner*—Vincent P. Canney
*Attorney, Agent, or Firm*—Robin, Blecker, Daley & Driscoll

[57] ABSTRACT

A rotary head type reproducing apparatus having a reproducing rotary head for reproducing signals recorded on a recording medium and a rotary erasing head for erasing signals recorded on the recording medium, both heads being mounted on a rotary member, wherein a reproduction amplifier for amplifying a reproduced signal reproduced by the rotary reproducing head is put on the rotary member and supply of electrical power to the reproduction amplifier is made through a rotary transmitter which, when erasing, transmits an erasing signal to the erasing head therethrough.

7 Claims, 1 Drawing Sheet

ROTARY HEAD TYPE REPRODUCING APPARATUS

This application is a continuation of application Ser. No. 320,791, filed Mar. 8,1989, abandoned which is a continuation of application Ser. No. 925,303, filed Oct. 31, 1986, now abandoned.

BACKGROUND OF THE INVENTION

1. Field of the Invention

This invention relates to a rotary head type reproducing apparatus, and more particularly to a rotary head type reproducing apparatus having a reproducing rotary head for reproducing a signal recorded on a recording medium, and a rotary erasing head for erasing the signal recorded on the recording medium.

2. Description of the Related Art

In the past, the rotary head type reproducing apparatus such as video cassette recorders (VCRs) had their reproduction amplifier positioned outside of the rotary drum. Therefore, the reproduced signal from the reproducing head on the rotary drum had to be placed onto the stationary side by the rotary transmitter before it was amplified.

Since the conventional apparatus are of such form, because the length of transmission path across the rotary transmitter to the reproduction amplifier becomes too long, there is a high possibility of noise entering into the minute reproduced signal. Therefore, the S/N ratio of the reproduced signal is low. It has been considered to position the reproduction amplifier onto the rotary drum in order to shorten the path of transmission or the minute reproduced signal. In such a case, however, need arises for means be provided for supplying electrical power to the reproduction amplifier, taking the form of a slip ring. The use of this power supply means as an additional part gives rise to an increase in the complexity of structure and the apparatus becomes expensive.

SUMMARY OF THE INVENTION

An object of the present invention is to provide a rotary head type reproducing apparatus which can overcome the above-described problem.

Another object of the invention is to provide a rotary head type reproducing apparatus which enables the S/N ratio of the reproduced signal to be improved without involving any increase in the complexity of structure.

Under such objects, in an embodiment of the invention, a rotary head type reproducing apparatus is proposed, comprising a reproducing rotary head for reproducing signals recorded on a recording medium, a rotary erasing head for erasing signals recorded on the recording medium, means for amplifying a reproduced signal reproduced by the reproducing rotary head, a first rotary transmitter for transmitting the reproduced signal amplified by the amplifying means, a second rotary transmitter for transmitting an erasing signal to be supplied to the rotary erasing head, and means for supplying electrical power to the amplifying means through the second rotary transmitter.

Other objects and features of the invention will become apparent from the following detailed description of an embodiment thereof by reference to the accompanying drawings.

DETAILED DESCRIPTION OF THE PREFERRED EMBODIMENTS

Figure 1:
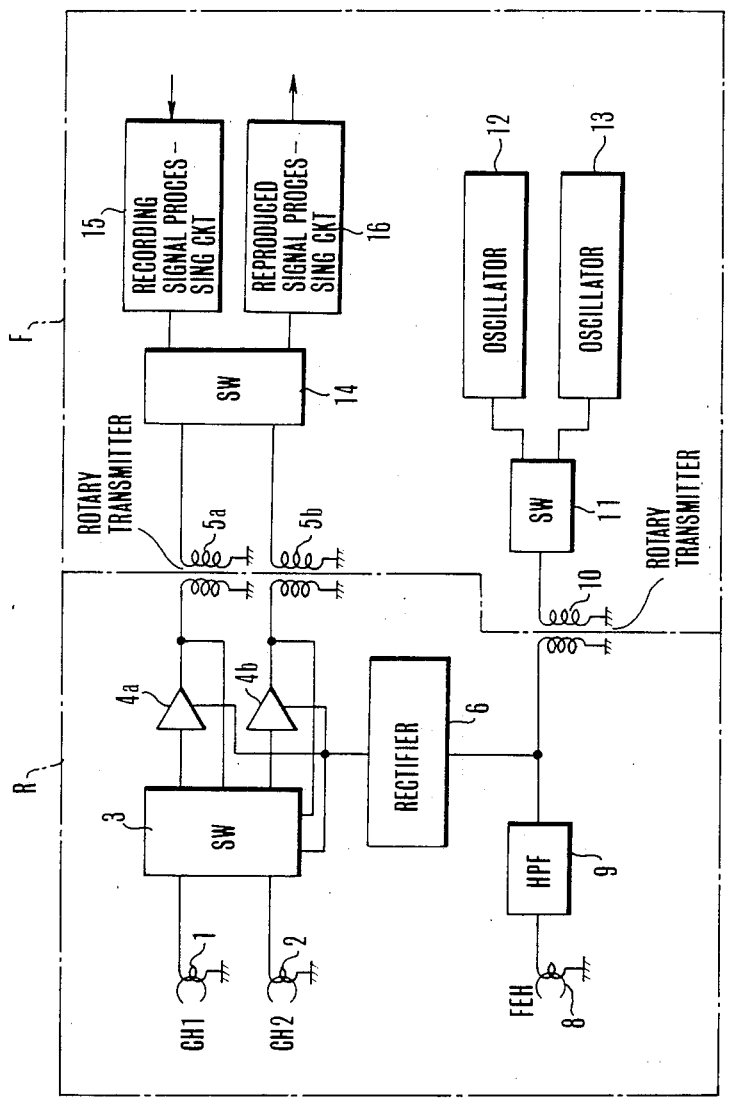
FIG. 1 is a schematic circuit diagram, partly in block form, of the essential parts of an embodiment of the magnetic recording and reproducing apparatus according to the present invention.

In FIG. 1, the magnetic recording and reproducing apparatus includes magnetic recording and reproducing rotary heads 1 and 2, switches (SW) 3 and 11, reproduction amplifiers 4a and 4b, rotary transmitters 5a and 5b for transmission of signals, a rectifier 6, a rotary erasing head (flying erase head (FEH)) 8, a high pass filter (HPF) 9, another transmitter 10 for FEH, and oscillators 12 and 13. The parts within a block R are provided on the rotary drum, and the other parts within a block F are provided on a framework of the apparatus.

In operating the apparatus of such construction, when in the recording mode, a signal of several MHz from the oscillator 12 is selected by the switch 11 to be applied to the rotary transmitter 10 and therefrom to the FEH 8 through the HPF 9. The output of the rotary transmitter 10 is also applied to the rectifier 6, and the rectified signal is supplied as the electrical power to the SW 3.

Signals from an inlet are applied to a recording signal processing circuit 15 which then produces recordable signals. The recordable signals are supplied through the SW 14 to the rotary transmitters 5a and 5b, then transferred by the transmitters 5a and 5b to the rotary drum, and then directed to the heads 1 and 2 by the SW 3, thus being recorded on a magnetic tape.

When in the reproduction mode, the SW 11 selects the oscillator 13 to apply a signal of lower frequency than that of the signal of the oscillator 12 to the rotary transmitter 10. Because such a signal cannot pass through the HPF 9, the output of the rotary transmitter 10 does not reach the FEH 8, but is routed to the rectifier 6 and therefrom supplied as the electrical power to the SW 3 and the reproduction amplifiers 4a and 4b. And, the reproduced signals by the recording and reproducing heads 1 and 2 are applied by the SW 3 to the reproduction amplifiers 4a and 4b. The outputs of the reproduction amplifiers 4a and 4b are supplied through the rotary transmitters 5a and 5b to the SW 14 where they become sequential signals which are then applied to a reproduced signal processing circuit 16.

As has been described above, according to the invention, the amplifiers for the reproduced signals are positioned on the rotary drum R, and the rotary transmitter for the erasing head is arranged upon setting of the reproduction mode to also serve as means for supplying electrical power to the reproduction amplifiers therethrough. These features make it possible to dispense with particular means which would otherwise be necessary to supply electrical power from the block F to the block R, and maintain the size and cost at a minimum, and the S/N ratio of the reproduced signal is improved.

What is claimed is:

1. A rotary head type recording and reproducing apparatus comprising:
   (a) a fixed member which includes
      (1) a recording signal processing means arranged to produce a recording signal,
      (2) a recording signal processing means arranged to receive a reproduced signal, and
      (3) an erasing signal producing means arranged to produce an erasing signal;
   (b) a rotary member which includes (1) a first rotary head for recording the recording signal on a recording medium in a recording mode and for reproducing signals for the recording medium to produce the reproduced signal in a reproducing mode, (2) a second rotary head arranged to receive the erasing signal for erasing signals recorded on the recording medium in said recording mode, and (3) amplifying means for amplifying the reproduced signal in said reproducing mode; and (c) a rotary transmitter which includes (1) a first channel arranged to transmit the recording signal from the fixed member to the rotary member in said recording mode, and arranged to transmit the reproduced signal from the rotary member to the fixed member in said reproducing mode, and (2) a second channel arranged to transmit the erasing signal from the fixed member to the rotary member in said recording mode, and arranged to transmit electrical power for driving said amplifying means from the fixed member to the rotary member in said reproducing mode.

2. An apparatus according to claim 1, wherein said fixed member further includes means for generating an alternating signal of lower frequency that that of said erasing signal to be supplied to said second channel.

3. An apparatus according to claim 2, wherein said fixed member further includes supply means for selectively supplying said alternating signal and said erasing signal to said second channel.

4. An apparatus according to claim 2, wherein said rotary member includes rectifying means for rectifying said alternating signal passes through said second channel to drive said amplifying means.

5. An apparatus according to claim 2 wherein said rotary member further includes prohibiting means for prohibiting said alternating signal passed through said second channel from being supplied to said second rotary head.

6. An apparatus according to claim 5, wherein said prohibiting means includes a high pass filter.

7. A rotary head type recording and reproducing apparatus comprising:

(a) a fixed member which includes (1) a recording signal processing means arranged to produce a recording signal, (2) a reproduced signal processing means arranged to receive a reproduced signal, and (3) an erasing signal producing means arranged to produce an erasing signal, (b) a rotary member which includes (1 recording means for recording the recording signal on a recording medium in a recording mode, (2) reproducing means for reproducing signals from the recording medium in a reproducing mode, said reproducing means including an amplifier arranged to amplify signals reproduced from the recording medium, and (3) erasing means for erasing signals recorded on the recording medium in said recording mode; and (c) a rotary transmitter arranged to transmit signals between the fixed member and the rotary member, the rotary transmitter including (1) a first channel arranged to transmit the recording signal from the recording signal processing means to the recording means in said recording mode, and for transmitting the reproduced signal from the reproducing means to the reproduced signal processing means in said reproducing mode, and (2) a second channel for transmitting the erasing signal from the erasing signal producing means to the erasing means in said recording mode, and the transmitting electrical power for driving said amplifier from the fixed member to the rotary member in said reproducing mode.

* * * * *